E. N. SMITH.
FENDER FOR HAY RAKES.
APPLICATION FILED JULY 6, 1912.
1,080,125.
Patented Dec. 2, 1913.
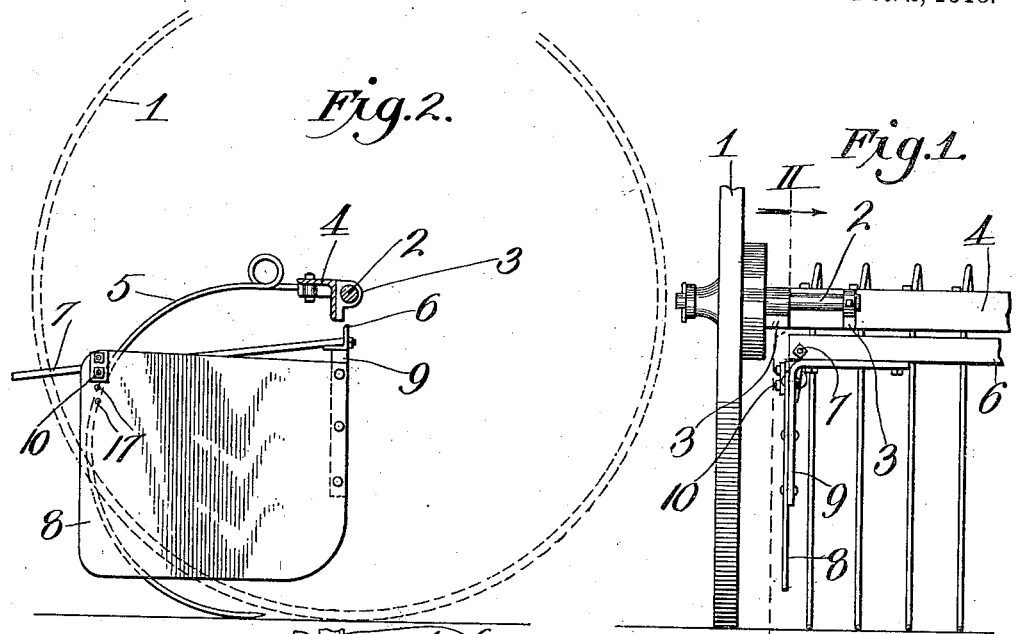
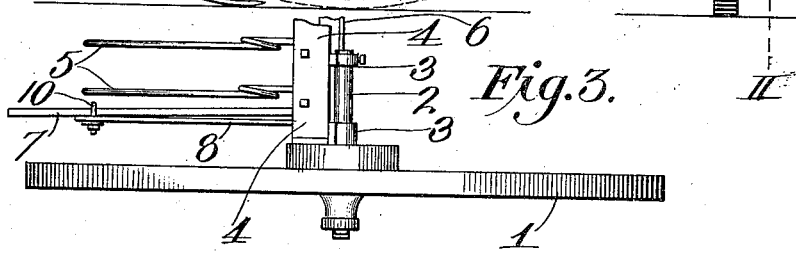
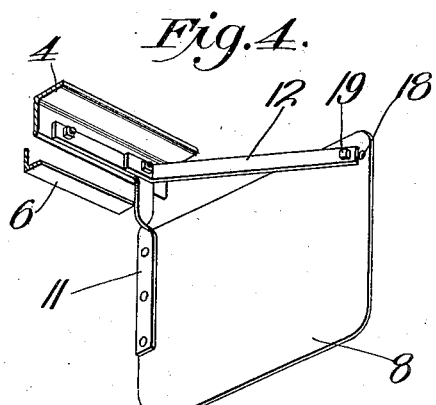
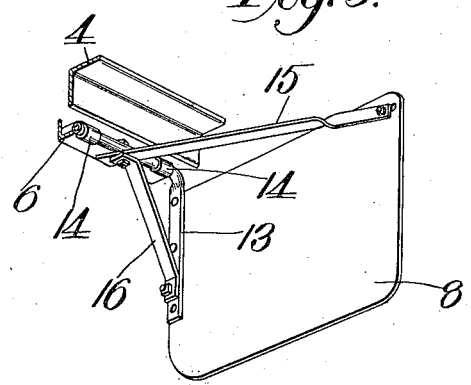
Witnesses
Frank R Glore
M. K. Preston
Inventor
E. N. Smith
By George J Thorp Atty.

UNITED STATES PATENT OFFICE.

ERNEST N. SMITH, OF WONSEOU TOWNSHIP, CHASE COUNTY, KANSAS.

FENDER FOR HAY-RAKES.

1,080,125.   Specification of Letters Patent.   Patented Dec. 2, 1913.

Application filed July 6, 1912. Serial No. 708,059.

*To all whom it may concern:*

Be it known that I, ERNEST N. SMITH, a citizen of the United States, residing in Wonseou township, in the county of Chase and State of Kansas, have invented certain new and useful Improvements in Fenders for Hay-Rakes, of which the following is a specification.

This invention relates to hay rakes and my object is to produce fenders for insuring a clean raking operation by preventing a constant waste of hay at the ends of the rake.

Another object is to provide fenders which will prevent long grasses from becoming entangled with the wheels and winding upon the axles.

To these ends the invention consists in certain novel and peculiar features of construction and organization as hereinafter described and claimed; and in order that it may be fully understood reference is to be had to the accompanying drawing, in which:—

Figure 1, is a fragmentary front view of a hay rake embodying my invention, the fender shown bearing a fixed relation to a stationary part of the rake. Fig. 2, is a section on the line II—II of Fig. 1. Fig. 3, is a plan view of the construction shown by Fig. 1. Fig. 4, is a fragmentary perspective view showing a fender which swings with the rake teeth. Fig. 5, is a fragmentary perspective view showing a fender which is capable of swinging to ride over obstructions without regard to the position of the rake teeth.

In the said drawing, 1 indicates one of the wheels, 2 the usual stub-shaft or axle upon which said wheel is journaled, 3 the usual brackets receiving said stub-shaft or axle and 4 the rake head from which the teeth 5 project, the opposite end of the rake head being of course, connected to duplicate parts 1, 2 and 3.

Below the stub-shafts or axles is a cross bar 6 rigid with the frame (not shown) of the machine, and projecting rearward from the cross bar 6 are the end bars 7 of the usual or any preferred device for stripping the hay from the teeth of the rake when the same are raised by means common in hay rakes and therefore not shown.

8 indicates one of a pair of fenders arranged vertically between the rake teeth and the wheels 1, and extending from about the vertical plane of the axle to about the vertical plane of the rearmost portions of the teeth when the latter are in operative position, as shown. The fender is also disposed a sufficient distance above the ground to clear the usual inequalities in the surface thereof or small rocks or other obstructions thereon. In the construction shown by Figs. 1, 2 and 3, each fender is equipped at its front end with an angle bracket 9, the horizontal arm of which underlies and is secured rigidly to the rigid bar 6 of the rake, and to guard against lateral vibration of the rear end of each fender and to assist in the support of the same, it is provided with a U-bolt 10 through which extends the adjacent end bar 7 of the rake-teeth stripping device.

In the construction shown by Fig. 4, each fender 8 is connected rigidly at its front end by bracket 11 corresponding generally to bracket 9, to the rake head 4, and to guard against lateral vibration of the fender and to assist in supporting it, inclined brace 12 extends from its rear upper corner to the upper end of the bracket 11. In this construction the fenders bear a rigid relation to the teeth and therefore swing upward and downward therewith.

In the construction shown by Fig. 5, each fender is provided at its front end with an angle bracket 13, the upper arm of which is cylindrical and projects horizontally inward adjacent to cross bar 6, and is pivoted in bearing brackets 14 carried by said bar. The fender is also additionally supported and held against undue lateral vibration by an inclined brace 15 secured at its rear end to the upper rear corner of the fender and at its front end to the pivoted arm of bracket 13, and said bracket is stiffened and strengthened by an inclined brace 16 extending from the lower end of the bracket inwardly and upwardly and secured to the horizontal arm of bracket 13 and the front end of brace 15. By this construction it will be seen that the fenders under consideration are capable of swinging upwardly independently or together in the event that either or both of them encounter an obstruction, it being also noticed that the front end of the brace 15 projects forwardly beyond the pivoted arm of the bracket 13 and bears against the underside of bar 6 for the purpose of limiting downward swinging movement of the fender beyond a predetermined point.

Provision is made in the construction shown by Figs. 1 to 3 inclusive to accommodate the securing of the rear portion of the fender at different distances from the ground, and in the constructions of Figs. 4 and 5, to secure the rear ends of the fenders at the desired distance from the ends of the rake.

In the constructions shown by Fig. 1 to 3 inclusive, the fender is provided with supplemental holes 17 for the reception of the U-bolt 10, in the event it is desired to secure the fender in a more elevated position than it is shown in said figures.

In the construction shown by Fig. 4, an additional hole 18 is provided to receive the bolt 19 by which the rear end of brace bar 12 is secured to the fender for lateral adjustment of the latter. In the construction shown by Fig. 5, the same provision is made. These matters of adjustment, however, do not involve invention and therefore need not be particularly described.

In operation the hay is gathered up in the usual manner but its tendency to spread unduly is guarded against by the fenders, which thus not only eliminate the usual waste in raking short grasses but also the trouble encountered through long grasses— particularly in windy weather—climbing the wheels and becoming so entangled as to interfere with the automatic dumping of the rake.

From the above description it will be seen that I have produced fenders for rakes, which embody the advantageous features enumerated as desirable in the statement of the object of the invention, and which may be modified in various particulars without departing from the principle of construction as defined in the appended claims.

I claim:

1. The combination with a hay rake having supporting wheels and a rake between the wheels, of a pair of vertical fenders, one arranged between each wheel and the adjacent end of the rake, angle brackets having vertical arms secured to the upper front corners of said fenders and horizontal arms supported adjacent the ends of the rake and extending inward toward the middle of the rake, and rearwardly extending braces having their front ends supported adjacent the horizontal arms of said brackets and their rear ends adjustably connected to the upper rear corners of the fenders.

2. The combination with a hay rake having supporting wheels and a rake between the wheels, of a cross bar below the axial line of the wheels, a pair of vertical fenders, one arranged between each wheel and the adjacent end of the rake, angle brackets having their vertical arms secured to said fenders and their horizontal arms connected pivotally to said cross bar, and rearwardly extending braces having their rear ends secured to the upper rear corners of said fenders and their front ends connected to said horizontal arms and extending into position to engage said cross bar to limit the downward swinging of the fenders.

In testimony whereof I affix my signature, in the presence of two witnesses.

ERNEST N. SMITH.

Witnesses:
G. Y. THORPE,
G. W. DUVALL.

Copies of this patent may be obtained for five cents each, by addressing the "Commissioner of Patents Washington, D. C."